United States Patent [19]

Rawlinson

[11] 4,329,196
[45] May 11, 1982

[54] METHOD OF MAKING A THREE-DIMENSIONAL LAMINATE

[75] Inventor: George R. Rawlinson, Ferguson, Mo.

[73] Assignee: Monsanto Company, St. Louis, Mo.

[21] Appl. No.: 67,205

[22] Filed: Aug. 16, 1979

[51] Int. Cl.³ .............................................. B29D 9/00
[52] U.S. Cl. ................................. 156/243; 156/244.11; 156/244.23; 156/244.24; 156/244.27; 156/322
[58] Field of Search .............. 156/243, 244.11, 244.21, 156/244.23, 244.24, 244.26, 244.27, 320, 321, 322, 282, 500, 501

[56] References Cited

U.S. PATENT DOCUMENTS

| 2,897,109 | 7/1959 | Voigtman | 156/244.24 |
|---|---|---|---|
| 3,058,863 | 10/1962 | Gaines | 156/244.11 |
| 3,077,428 | 12/1963 | Heuser et al. | 156/244.24 |
| 3,294,613 | 12/1966 | Eichler | 156/501 |
| 3,398,035 | 8/1968 | Cleereman | 156/244.11 |
| 3,421,960 | 1/1969 | Arbit | 156/500 |
| 3,481,818 | 12/1969 | Wellen | 156/500 |
| 3,486,961 | 12/1969 | Adams | 156/324 |
| 3,507,010 | 4/1970 | Doleman | 264/216 |
| 3,590,109 | 6/1971 | Doleman | 264/216 |
| 3,600,250 | 8/1971 | Evans | 156/244.11 |
| 3,669,794 | 6/1972 | Mazur | 156/244.11 |
| 3,682,736 | 8/1972 | Akamatsu | 156/210 |
| 3,899,192 | 8/1975 | Reddaway | 280/154.5 R |
| 3,932,248 | 1/1976 | Keaton | 156/210 |

FOREIGN PATENT DOCUMENTS

| 1456532 | 9/1976 | France . |
| 2388659 | 4/1978 | France . |
| 1385716 | 2/1975 | United Kingdom . |
| 1394692 | 5/1975 | United Kingdom . |

Primary Examiner—Caleb Weston
Attorney, Agent, or Firm—Schuyler, Banner, Birch, McKie & Beckett

[57] ABSTRACT

A heat-sensitive, three-dimensional thermoplastic layer is laminated to a thermoplastic substrate by a specific fusion bonding process which produces a laminate having substantially no thermal distortion. This process employs cooling to protect the three-dimensional structure from thermal damage and balancing of the heat flow from the substrate to prevent warpage. In the preferred process a grass-like sheet of low density polyethylene is fusion bonded to a rigid high density polyethylene substrate.

27 Claims, 3 Drawing Figures

METHOD OF MAKING A THREE-DIMENSIONAL LAMINATE

The present invention is directed to a method for producing a three-dimensional laminate. More particularly, this invention is directed to a method of fusion bonding a heat sensitive three-dimensional thermoplastic layer to a substrate without damaging the three-dimensional structure.

Processes for bonding similar and dissimilar materials together by fusion bonding are well known. Fusion bonding of running length sheet stock materials is often integrated with the sheet extrusion process. In one variant of this integrated process, lamination is accomplished by co-extrusion and mating of two or more molten sheets prior to any sizing or polishing operations. Extrusion of a single molten film onto a solid substrate has also been employed. In a related process, an extruded sheet is allowed to cool slightly to the near molten state and is laminated to another sheet after an initial pass through sizing rolls.

While the prior art methods are acceptable when the materials being laminated are flat sheets or films, serious problems are encountered when one of the layers to be laminated has a three-dimensional structure which is sensitive to heat and/or pressure. Prior art methods of fusion bonding cause melting and thermal distortion of the structure of a three-dimensional layer resulting in an unacceptable laminate. Moreover, attempts to laminate a three-dimensional layer to a substrate by the prior art fusion bonding methods result in significant warpage of the substrate layer. Because of these problems the prior art has turned, in some instances, to alternative laminating methods such as adhesive bonding. Certain materials, however, can only be laminated effectively by a fusion process. For example, high density polyethylene and low density polyethylene cannot be laminated to give a product with structural strength when using adhesive bonding.

Accordingly, it is an object of the present invention to provide a method for laminating a three-dimensional, heat-sensitive layer to a substrate by the use of fusion bonding without imparting any substantial thermal distortion to the three-dimensional structure of the laminate.

It is also an object of the present invention to produce a three-dimensional laminate which is substantially free from substrate sheet warpage.

These and other objects of the present invention are achieved by providing a method for producing a three-dimensional laminate substantially free of thermal distortion, this method comprising the steps of (a) continuously contacting a first surface of a near molten thermoplastic substrate with a heat-sensitive three-dimensional thermoplastic layer to form a laminate, the temperature of the substrate being sufficient to effect fusion bonding of the three-dimensional layer to the substrate without substantial thermal distortion of the three-dimensional layer; (b) simultaneously inhibiting the loss of heat from the surface of the substrate opposite to the first surface to balance the heat flow from opposing surfaces of the substrate during the contacting; and (c) maintaining a balanced heat flow from opposed surfaces of the substrate as the laminate is cooled.

In its most preferred form the present invention provides a method for producing a laminate comprising a grass-like layer of low density polyethylene and a rigid substrate layer of high density polyethylene, the laminate being substantially free of distortion in the grass-like layer and substantially free of warpage in the substrate layer, the method comprising the steps of (a) continuously extruding molten high density polyethylene to form a substrate layer; (b) passing the substrate layer between a first pair of sizing rolls after it has cooled to near molten condition; (c) passing the resulting sized, near molten substrate layer between a second pair of rolls comprising a heated roll and a pressure roll; (d) simultaneously passing the grass-like layer between the second pair of rolls, the pressure roll urging the grass-like layer into intimate contact with one surface of the substrate layer, the heated roll being at a temperature sufficient to balance the heat flow from the opposing surfaces of the substrate layer, and the second pair of rolls being located at a position downstream of the extruder where the near molten substrate has a temperature sufficient to melt the contacting surface of the grass-like layer to effect fusion bonding of the grass-like layer to the substrate layer; (e) passing the three-dimensional layer side of the resulting laminate around a cooling roll to protect the three-dimensional layer from thermal distortion; and (f) passing the laminate through a cooling zone in which a controlled flow of a cooling fluid is passed over the three-dimensional layer side of the laminate.

Figure 1:
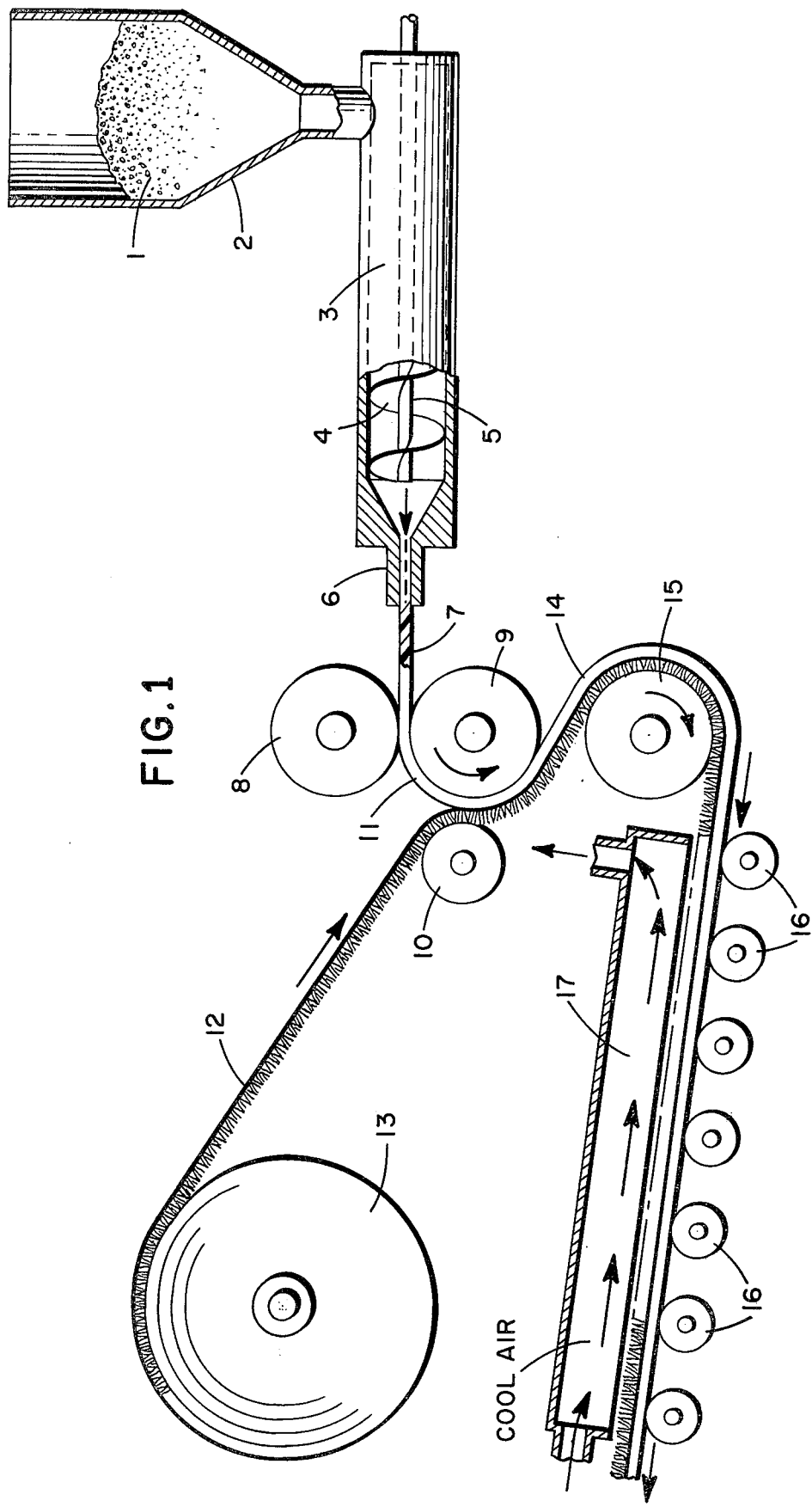
FIG. 1 is a schematic drawing showing one form of the laminating process of the present invention.

The present invention is directed to a method for laminating a three-dimensional layer to a substrate layer. In the preferred embodiment the three-dimensional layer and the substrate layer utilize thermoplastic materials of the same or similar chemical makeup so that they may be directly fusion bonded together.

The substrate layer may be chosen from any thermoplastic material which can be extruded to form a self-supporting near molten sheet. The choice of a particular substrate material will, of course, depend on the use to which the final laminate will be put and the properties required by that application. Among the thermoplastic materials which can be employed for the substrate portion of the laminate of the present invention are polyolefins such as polyethylene and polypropylene, polyvinyl halides such as polyvinyl chloride, polyvinyl esters such as polyvinyl acetate, styrene copolymers such as ABS, and blends or copolymers of the foregoing. The substrate may be flexible, semi-rigid or rigid depending on the materials chosen. In addition, the substrate can be foamed or unfoamed depending on the laminate application. An unfoamed substrate of high density polyethylene having a density in the range of 0.945 to 0.960 is most preferred when the laminate is to serve as a barrier to reduce splash and spray from vehicle tires.

The three-dimensional layer of the laminate made according to the process of the present invention may be selected from any thermoplastic materials which are moldable to form a three-dimensional layer. The process is particularly applicable to those materials subject to heat damage or distortion during fusion bonding. As in the case of the substrate layer, the choice of materials for the three-dimensional layer will depend somewhat on the particular application envisioned for the laminate. Any of the materials listed above for the substrate can be employed for the three-dimensional layer. The material can be the same as the substrate material or of a similar chemical nature. The three-dimensional layer, however, preferably has a somewhat lower melting temperature than the temperature at which the substrate can be extruded to facilitate the fusion bonding process. For use in producing a vehicle tire spray dispersing laminate, the most preferred three-dimensional layer material is low density polyethylene having a density in the range of about 0.90 to 0.93.

In addition to the above-described polymer materials, both the substrate layer and the three-dimensional layer can contain any of the known modifiers or adjuvants such as pigments, stabilizers and the like.

The three-dimensional layer may take any physical form suitable for the application envisioned for the laminate. In general, the three-dimensional layer should have a three-dimensional structure which is sensitive to heat and pressure such that fusion bonding by ordinary techniques results in thermal distortion and/or damage of the three-dimensional structure. One preferred form of this three-dimensional layer comprises a grass-like sheet which is made by a continuous injection molding process described in Doleman U.S. Pat. No. 3,590,109 and Doleman U.S. Pat. No. 3,507,010, which are hereby incorporated by reference. The grass-like sheet has a plurality of upstanding randomly oriented projections integrally molded with a base layer or base grid. Preferably, the three-dimensional layer is manufactured separately and supplied to the laminating system as roll stock. It is, of course, possible to directly combine the injection molding process described in the aforementioned patents with the laminating process of this invention, provided that the newly molded three-dimensional layer has sufficient time to set up prior to entering the laminating system.

While numerous materials and product configurations are contemplated by the present invention as generally described above, the following discussion will serve to illustrate the invention by describing preferred embodiments in which a grass-like layer of low density polyethylene is fusion bonded to a substrate layer of high density polyethylene.

Turning now to FIG. 1, the preferred process of the present invention will be described. A high density polyethylene material 1 having a density in the range of about 0.945 to 0.960 (preferably about 0.956) and a melt index from about 0.1 to about 0.95 (preferably 0.3) is fed from a hopper 2 into a screw feed extruder. This extruder comprises a barrel section 3 containing screw flights 4 which rotate about shaft 5 which is driven by a power source not shown. The extruder barrel is preferably heated in a known manner to assist in converting the polyethylene material into a molten state. Positioned at the discharge end of the extruder barrel is an extrusion die 6 which preferably shapes the molten material into a thin sheet of substantially flat cross section.

The apparatus employed for the extrusion and the parameters of the extrusion process may vary widely with the choice of materials to be processed and other engineering considerations. Typically the extrusion of high density polyethylene substrates can be advantageously effected in a 4½ inch diameter barrel extruder of the type made by Johnson Plastics Machinery Co. Operating such an extruder at about 60 to 100 RPM with a throughput of about 500 to about 1000 pounds of product per hour will result in extrusion pressures at the die of about 3500 to about 5000 psig and a line speed of about 40 to 70 inches/minute. During this typical operation, the temperature of the extruder barrel will vary from about 290° F. at the inlet to about 330° F. at the outlet end. A die temperature of about 330° F. is achieved. Normal extrusion temperatures and pressures for other thermoplastic materials may be similarly employed in the known manner. The thickness of the extruded substrate layer can, of course, vary according to the intended use of the laminate. In practice, substrate layer thicknesses of from about 25 to 250 mils have been successfully employed in the process of the present invention. In its preferred form, the high density polyethylene substrate layer is extruded at a thickness of from about 150 to 250 mils.

The surface of the freshly extruded substrate 7 is cooled by exposure to the air and solidified to form a surface skin. In this state, termed near molten, the core of the substrate layer is still at a temperature above its melting point. The substrate layer in this near molten condition is preferably passed through a pair of sizing rolls shown at 8 and 9. The primary purpose of these rolls is to impart a uniform cross section of controlled thickness to the freshly extruded sheet. Roll 8 serves only this purpose and its temperature is therefore not critical. Any temperatures from ambient up to the sticking point, i.e., the temperature at which the extruded thermoplastic layer sticks to the roll, can be satisfactorily employed. In practice roll 8 is generally kept at a temperature of about 140° to 160° F. In the embodiment shown in FIG. 1 roll 9 serves not only as one of the sizing rolls, but also cooperates with roll 10 to form a pair of laminating rolls. It is, of course, possible to employ separate sizing and laminating rolls in such a way that roll 9 need not serve both functions (see FIG. 2). Sizing rolls can be made of any suitable non-sticking material. Typically such rolls have a smooth polished metal finish.

The lamination step of the process of the present invention occurs between the nip of rolls 9 and 10. The sized, near molten substrate layer 11 is contacted between these rolls with a three-dimensional sheet 12 from storage roll 13. The three-dimensional sheet is preferably a previously formed grass-like layer produced by continuous injection molding of a low density polyethylene having a density of from about 0.90 to about 0.93 (preferably 0.918) and a melt index of from about 5 to 50 (preferably about 22). The thickness of the grass-like sheet may vary widely. In practice a grass-like sheet of from about 250 to 500 mils has been satisfactorily employed. The grass-like sheet may have a solid or perforated base surface depending on the conditions of its manufacture. The base surface of the grass-like layer is preferably contacted with the surface of the near molten substrate. Laminating roll 10, referred to as the pressure roll, urges the grass-like layer into intimate uniform contact with the sized near molten substrate layer. Pressure roll 10 is preferably kept at ambient temperatures although it can be cooled if desired. Roll 10 can be fabricated from any of the normally employed roll materials such as steel or rubber.

The extruder temperature, the line speed of extruded sheet, and the distance to laminating rolls 9 and 10 from the extruder are all chosen in a manner such that the temperature of the near molten substrate layer 11 is sufficient to effect fusion bonding of the two layers. As the three-dimensional layer comes in contact with the near molten substrate layer, the heat insulating effect of the three-dimensional layer causes the surface temperature of the substrate layer to rise, melting the previously formed surface skin. At this elevated temperature, the base surface of the grass-like layer is also melted and the two materials penetrate each other slightly to form an area which upon solidification will bond the two layers together.

When only these two layers are employed, the three-dimensional layer should have a melting temperature below that at which the near molten substrate can be extruded. Even where both layers are made of the same material, the necessary heat for melting the three-dimensional layer can be obtained by extruding the substrate at a temperature above its melting range. Fusion bonding is preferably effected when the contiguous substrate surface temperature is at least about 20° F. above the softening point of the three-dimensional layer. The low density polyethylene grass-like layer of the preferred embodiment begins to melt at about 280° F. whereas the core temperature of the near molten extruded high density polyethylene substrate is about 340° F.

Figure 3:
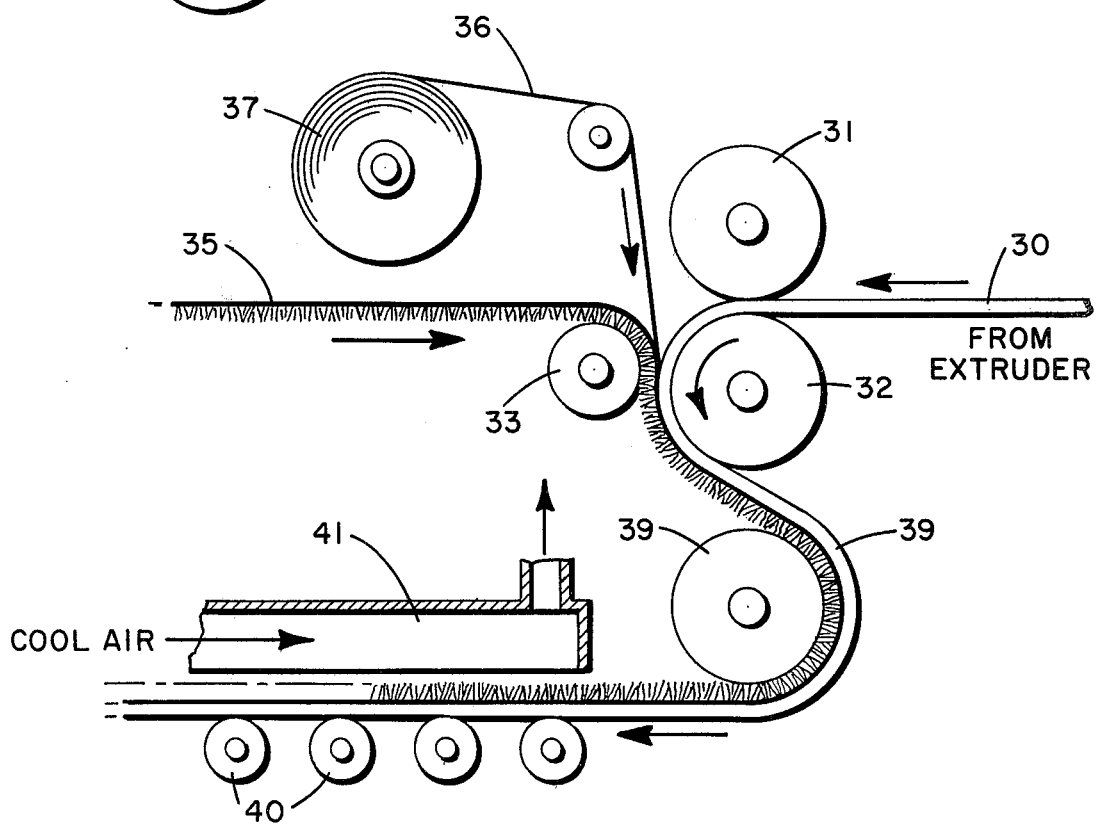
FIG. 3 is a schematic drawing of still another embodiment of the process of the present invention.

As described more fully in conjunction with the description of FIG. 3, some materials are not directly fusion bondable due to differences in chemical nature or in melting temperatures. In these instances fusion bonding according to the process of the present invention may be effected by employing an interlayer of normally solid adhesive material which is chemically compatible with both layers and which has an appropriate melting temperature. Such adhesive films are well known and can include, for example, materials based on polyvinyl acetate. The thickness of this interlayer adhesive film will depend on the film properties and the materials being laminated. Typically, adhesive film thickness of from about 0.5 to 10 mils are employed.

Simultaneously with fusion bonding effected by the heat supplied from the core of the extruded sheet, heated roll 9 serves to inhibit the loss of heat from the surface of the substrate layer opposite that contacted by the three-dimensional sheet. This inhibition of heat loss prevents warpage or distortion of the substrate layer by balancing the heat flow from opposing surfaces of the near molten substrate as it cools. The heat insulating effects of the three-dimensional layer substantially reduce the net heat flow from the laminated surface of the substrate. In order to similar reduce the heat flow from the opposing surface of the substrate, roll 9 is heated. Depending on the nature of the substrate and the distance from the extrusion die, the temperature of roll 9 can be varied to provide balanced heat flow conditions. The upper limit of temperature for roll 9 is dictated by the sticking point, i.e., the point which the lower surface of the substrate begins to stick to the roll. At the lower end, the temperature will be determined by the minimum necessary to balance the heat flow in the substrate. In practice when laminating to an extruded high density polyethylene sheet having a thickness of about 187 mils and extruded at a rate of about 630 pounds per hour, a heated roll temperature in the range of about 180° to 200° F. is usually sufficient. High density polyethylene has a sticking temperature with respect to common roll materials such as steel somewhere in the range of about 200° to 220° F.

The still hot laminate 14 is then preferably passed around a cooling roll 15. The primary purposes of roll 15 are to turn the grass-like surface of the laminate upward without damaging the three-dimensional structure and to cool the grass-like surface of the laminate to prevent thermal damage thereto. Note that rolls 9 and 15 do not form a tight nip through which the laminate passes in compression. This feature also aids in protecting the grass-like surface of the laminate from damage or distortion.

Cooling roll 15 can be fabricated from normally employed roll materials. A smooth metal roll surface is preferred. Cooling roll 15 is maintained at a temperature of at least about 50° F. and preferably at least about 100° F. lower than heated roll 9. For the preferred polyethylene system described above a cooling roll temperature in the range of from about 50° to 100° F. can be advantageously employed.

As the partially cooled laminate leaves roll 15 it is conveyed by rolls 16 past a cooling zone 17 through which a regulated flow of cooling fluid is passed. The purpose of the cooling zone is twofold. First, continued protection of the grass-like surface from thermal distortion is provided. Secondly, as a result of convective heat losses from the unlaminated surface of the substrate as it travels around roll 15 and along the open conveyor, the heat flow from this surface of the substrate is increased. The upper surface of the substrate, however, is still thermally insulated by the three-dimensional layer and heat flow from this surface is lower than from the opposed surface. By passing a regulated flow of cooling fluid, e.g., cold air, over the upper surface of the laminate, the heat flow from the laminated surface of the substrate can be accelerated to match that of the opposed side. Temperatures and flow rates of the cooling medium, preferably air, may vary widely and will depend on processing conditions which give rise to the heat flow from the opposed substrate surface. In practice air temperatures of about 40° to 100° F. and preferably about 60° F. can be employed. The cooling air flow rates will depend on the design of the cooling zone, the air temperature and the cooling requirements. For an apparatus of the type shown schematically in FIG. 1 flow rates of from about 5000 to 15,000 SCFM have been satisfactorily employed.

The temperature to which the laminate may be cooled in zone 17 will depend on how the sheet is subsequently handled. In general, cooling to at least about 120° F. will result in a product that will remain undistorted if handled properly. If the product is to be stacked or otherwise subjected to pressure forces, somewhat lower temperatures are preferred.

Balancing of the net heat flow from opposing sides of the extruded near molten substrate is essential to achieving a flat linear product. Unless the heat flows are balanced by inhibiting heat loss from the bottom surface of the substrate at roll 9 and by removing heat from the upper surface in cooling zone 17, the laminate will have a warped, wavy appearance which is unsuitable for most applications.

Achieving the desired heat flow balance in the substrate as it leaves the laminating roll area may also be accomplished by substituting a solid insulating material conveyor for the open roll conveyor 16 shown in FIG. 1. In this embodiment, the insulative effect of the grass-like layer can be balanced by the insulative effect of the conveyor upon which the lower surface of the substrate rests. In such an arrangement extended cooling of the grass-like surface of the laminate may not be necessary.

Figure 2:
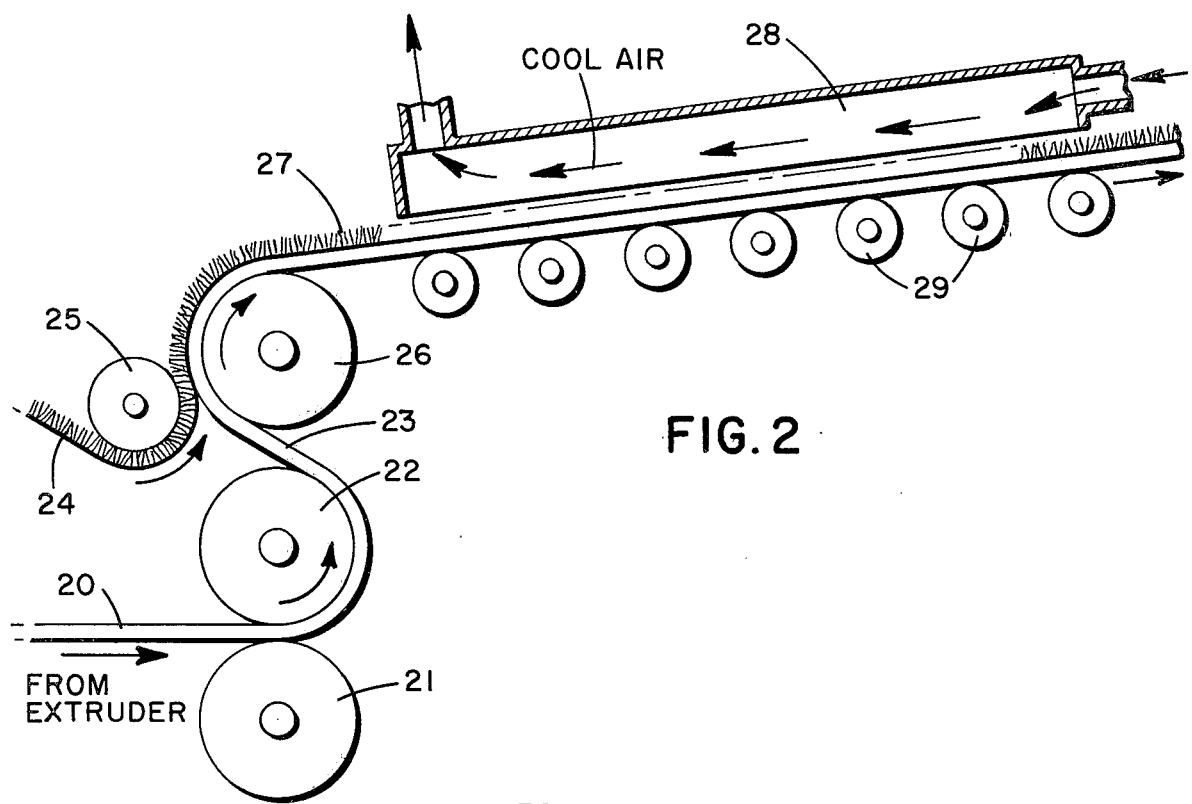
FIG. 2 is a schematic drawing showing an alternative embodiment of the process of the present invention.

FIG. 2 shows an alternative embodiment of the present invention in which the extruded sheet flows "up the stack" of rolls rather than "down the stack" as in FIG.

1. The near molten extruded sheet 20 passes through a pair of sizing rollers 21 and 22 which perform the same function as described in conjunction with FIG. 1. The hot substrate 23 is then fed along with the grass-like layer 24 between a pair of laminating rolls 25 and 26. Roll 25 is a pressure roll which, like roll 10 of FIG. 1, urges the grass-like sheet into contact with the substrate. Roll 26, like roll 9 in FIG. 1, is heated to a temperature sufficient to balance the heat flow from opposing surfaces of the substrate. Laminate 27 is then subjected to additional heat flow balancing in cooling zone 28 as previously described.

FIG. 3 shows another embodiment of the process of the present invention which is useful in forming laminates of materials which cannot be bonded by the fusion bonding process. In this embodiment, the near molten extruded substrate 30 is first sized by passing it between rolls 31 and 32 in the above-described manner. As in the embodiment shown in FIG. 1, roll 32 also coacts with roll 33 to form a pair of laminating rolls. Sized substrate 34, grass-like sheet 35 and interlayer 36 are fed as shown to the laminating rolls. Interlayer 36 is normally solid thermoplastic adhesive film which can be supplied from roll 37. As described above, the heat contained in the near molten extruded substrate brings the solid adhesive interlayer into a molten state whereby fusion bonding between the two layers is effected upon cooling. The bonded laminate 38 is then passed around a cooling roller 39 and drawn over an open conveyor having rolls 40 past cooling zone 41 to balance the heat flow in the above-described manner.

The product produced by the method of the present invention is a three-dimensional laminate having substantially no thermal distortion. Depending on the nature of the materials chosen and the configuration of the three-dimensional surface, the laminate according to the present invention can find any number of uses. In its preferred form the laminated product produced by the process of the present invention comprises a grass-like layer of low density polyethylene fusion bonded to a rigid high density polyethylene substrate. This laminate finds particular utility as a barrier for reducing splash and spray from the tires of a vehicle. A device of this type is fully described in Reddaway U.S. Pat. No. 3,899,192 which is hereby incorporated by reference.

The following specific Example is intended to illustrate more fully the nature of the present invention without acting as a limitation upon its scope.

EXAMPLE

This Example demonstrates the process of the present invention for producing a laminate of a three-dimensional grass-like layer and a rigid substrate. The grass-like layer was made of low density polyethylene having a density of about 0.918 and a melt index of about 22, and had a thickness of about 400 mils. This grass-like sheet was made according to the process described in Doleman U.S. Pat. Nos. 3,590,109 and 3,507,010.

The substrate layer was produced by extruding high density polyethylene having a density of 0.956 and a melt index of about 0.3. The substrate was produced on a $4\frac{1}{2}$ inch barrel, screw feed extruder equipped with a 56"×0.195" sheet die. The extruder was operated at 60 RPM with a rate of about 630 pounds per hour which developed extrusion pressures in the die of about 3500 to 5000 psig and a sheet line speed of about 40 inches/minute. Extrusion temperatures in the barrel varied from about 290° to about 330° F. and the die temperature was about 330° F.

The base surface of the grass-like layer laminated was contacted with the extruded substrate in an apparatus of the type shown in FIG. 1. Sizing roll 8 was held in about 150° F., heated roll 9 was held at about 190° F., and cooling roll 15 was held at about 100° F. Cooling air at a temperature of about 75° F. and at a rate of about 7500 SCFM was passed over the grass-like surface of the laminate in the cooling zone. The continuous three-dimensional laminate produced by this process has substantially no distortion in the three-dimensional structure and substantially no warpage in the substrate due to the heat flow balancing accomplished by roll 9 and in cooling zone 17.

While certain specific embodiments of the invention have been described with particularity herein, it will be recognized that various modifications thereof will occur to those skilled in the art. Therefore, the scope of the invention is to be limited solely by the scope of the appended claims.

I claim:

1. A method for producing a three-dimensional laminate substantially free of thermal distortion, said method comprising:
    (a) continuously feeding a normally solid adhesive layer between a heat-sensitive, unfoamed three-dimensional layer and a near molten thermoplastic substrate sheet to form a three-layer laminate, the temperature of said substrate being sufficiently above the melting temperature of said adhesive layer to effect the fusion bonding of said substrate in said three-dimensional layer;
    (b) simultaneously inhibiting the loss of heat from the exposed surface of said substrate to balance the heat flow from opposing surfaces of said substrate; and
    (c) maintaining a balanced heat flow from the opposing surfaces of said substrate as said laminate cools.

2. The method of claim 1 wherein said near molten thermoplastic substrate is continuously extruded immediately prior to said feeding step.

3. The method of claim 1 wherein the balanced heat flow of step (c) is maintained by cooling the three-dimensional layer side of said laminate.

4. The method of claim 1 wherein the balanced heat flow of step (c) is maintained by insulating the substrate side of said laminate.

5. The method of claim 1 wherein said three-dimensional layer has a grass-like configuration.

6. The method of claim 1 wherein said layers are fed together between a pair of rolls.

7. The method of claim 6 wherein said heat loss is inhibited by heating the one of said rolls which contacts said substrate.

8. A method for producing a three-dimensional laminate substantially free of thermal distortion, said method comprising the steps of:
    (a) continuously contacting a first surface of a near molten thermoplastic substrate sheet with a heat-sensitive three-dimensional grass-like thermoplastic layer to form a laminate, the temperature of said substrate being sufficiently above the melting temperature of said three-dimensional layer to effect fusion bonding of said three-dimensional layer to said substrate;
    (b) simultaneously inhibiting the loss of heat from the surface of said substrate opposite to said first surface to balance the heat flow from opposing surfaces of said substrate during said contacting; and (c) maintaining a balanced heat flow from opposed surfaces of said substrate as said laminate cools;

said three-dimensional layer comprising low density polyethylene and said substrate comprising high density polyethylene.

9. A method for producing a three-dimensional laminate substantially free of thermal distortion, said method comprising the steps of:

(a) continuously extruding a near molten thermoplastic substrate sheet;

(b) passing said near molten substrate between a pair of laminating rolls comprising a pressure roll and heated roll;

(c) simultaneously passing a heat-sensitive, unfoamed three-dimensional thermoplastic layer through said pair of laminating rolls, said pressure roll urging said three-dimensional layer into contact with said near molten substrate, said heated roll being at a temperature sufficient to balance the heat flow from opposing surfaces of said substrate, and the temperature of said near molten substrate being sufficiently above the melting temperature of said three-dimensional layer to effect fusion bonding of said three-dimensional layer to said substrate to form a laminate; and (d) subsequently cooling the three-dimensional layer side of said laminate to prevent thermal damage to said three-dimensional layer and to balance the heat flow from opposing surfaces of said substrate.

10. The method of claim 9 additionally comprising the step of passing said near molten substrate between a pair of sizing rolls before passing said substrate between said laminating rolls.

11. The method of claim 10 wherein a single roll serves as one of said sizing rolls and as said heated roll.

12. The method of claim 9 wherein said cooling is effected by passing a controlled flow of cooling fluid over the three-dimensional layer side of said laminate.

13. The method of claim 12 additionally comprising the step of passing the three-dimensional layer side of said laminate over a cooled roll before cooling with said controlled flow of cooling fluid.

14. The method of claim 12 or 13 wherein said cooling fluid is air.

15. The method of claim 10 wherein said three-dimensional layer has a grass-like configuration.

16. A method for producing a three-dimensional laminate substantially free of thermal distortion, said method comprising the steps of:

(a) continuously extruding a near molten thermoplastic substrate sheet;

(b) passing said near molten substrate between a pair of sizing rolls;

(c) passing said sized near molten substrate between a pair of laminating rolls comprising a pressure roll and a heated roll;

(d) simultaneously passing a heat-sensitive, three-dimensional, grass-like thermoplastic layer through said pair of laminating rolls, said pressure roll urging said three-dimensional layer into contact with said near molten substrate, said heated roll being at a temperature sufficient to balance the heat flow from opposing surfaces of said substrate, and the temperature of said near molten substrate being sufficiently above the melting temperature of said three-dimensional layer to effect fusion bonding of said three-dimensional layer to said substrate to form a laminate; and (e) subsequently cooling the three-dimensional layer side of said laminate to prevent thermal damage to said three-dimensional layer and to balance the heat flow from opposing surfaces of said substrate;

said substrate comprising high density polyethylene and said three-dimensional layer comprising low density polyethylene.

17. A method for producing a laminate comprising a grass-like layer of low density polyethylene and a substrate sheet of high density polyethylene, said laminate being substantially free of distortion in said grass-like layer and substantially free of warpage in said substrate, said method comprising the steps of:

(a) continuously extruding molten high density polyethylene to form a substrate sheet;

(b) passing said substrate between a pair of sizing rolls after it has cooled to near molten condition;

(c) passing the resulting sized, near molten substrate between a pair of laminating rolls comprising a heated roll and a pressure roll;

(d) simultaneously passing said grass-like layer between said pair of laminating rolls, said pressure roll urging said grass-like layer into intimate contact with one surface of said substrate, said heated roll being at a temperature sufficient to balance the heat flow from the opposing surfaces of said substrate, and said second pair of rolls being located at a position downstream of said extruder where said near molten substrate has a temperature sufficient to melt the contacting surface of said grass-like layer to effect fusion bonding of said grass-like layer to said substrate;

(e) passing the three-dimensional layer side of the resulting laminate around a cooling roll to protect said three-dimensional layer from thermal distortion; and (f) passing said laminate through a cooling zone in which a controlled flow of a cooling fluid is passed over said three-dimensional layer side of said laminate.

18. The method of claim 17 wherein a single roll serves as one of said sizing rolls and as said heated roll.

19. The method of claim 17 wherein said heated roll is maintained at a temperature of from about 180° to about 200° F.

20. The method of claim 17 wherein said cooling roll is maintained at a temperature of from about 50° to about 100° F.

21. The method of claim 17 wherein said cooling fluid is air.

22. The method of claim 17 wherein said cooling fluid is at a temperature of from about 40° to about 100° F.

23. A method for producing a three-dimensional laminate substantially free of thermal distortion, said method comprising:

(a) continuously feeding a normally solid adhesive layer between a heat sensitive, three-dimensional grass-like layer and a near molten thermoplastic substrate sheet to form a three layer laminate, the temperature of said substrate being sufficiently above the melting temperature of said adhesive layer to effect fusion bonding of said layers;

(b) simultaneously inhibiting the loss of heat from the exposed surface of said substrate to balance the heat flow from opposing surfaces of said substrate; and (c) maintaining a balanced heat flow from the opposing surfaces of said substrate as said laminate cools; said three-dimensional layer comprising low density polyethylene and said substrate comprising high density polyethylene.

24. A method for producing a three-dimensional laminate substantially free of thermal distortion, said method comprising the steps of:
 (a) continuously contacting a first surface of a near molten thermoplastic substrate sheet with a heat-sensitive unfoamed three-dimensional thermoplastic layer to form a laminate, the temperature of said substrate being sufficiently above the melting temperature of said three-dimensional layer to effect fusion bonding of said three-dimensional layer to said substrate, said contacting being accomplished by simultaneously feeding said substrate and said three-dimensional layer together between a pair of rolls;
 (b) simultaneously inhibiting the loss of heat from the surface of said substrate opposite to said first surface to balance the heat flow from opposing surfaces of said substrate during said contacting, said inhibiting of heat loss being effected by heating the one of said rolls which contacts said opposite surface; and
 (c) maintaining a balanced heat flow from opposed surfaces of said substrate as said laminate cools.

25. A method for producing a three-dimensional laminate substantially free of thermal distortion, said method comprising the steps of:
 (a) continuously contacting a first surface of a near molten thermoplastic substrate sheet with a heat-sensitive unfoamed three-dimensional thermoplastic layer to form a laminate, the temperature of said substrate being sufficiently above the melting temperature of said three-dimensional layer to effect fusion bonding of said three-dimensional layer to said substrate;
 (b) simultaneously inhibiting the loss of heat from the surface of said substrate opposite to said first surface to balance the heat flow from opposing surfaces of said substrate during said contacting; and
 (c) maintaining a balanced heat flow from opposed surfaces of said substrate as said laminate cools by cooling the three-dimensional layer side of said laminate.

26. A method for producing a three-dimensional laminate substantially free of thermal distortion, said method comprising the steps of:
 (a) continuously contacting a first surface of a near molten thermoplastic substrate sheet with a heat-sensitive unfoamed three-dimensional thermoplastic layer to form a laminate, the temperature of said substrate being sufficiently above the melting temperature of said three-dimensional layer to effect fusion bonding of said three dimensional layer to said substrate;
 (b) simultaneously inhibiting the loss of heat from the surface of said substrate opposite to said first surface to balance the heat flow from opposing surfaces of said substrate during said contacting; and
 (c) maintaining a balanced heat flow from opposed surfaces of said substrate as said laminate cools by insulating the substrate side of said laminate.

27. A method for producing a three-dimensional laminate substantially free of thermal distortion, said method comprising the steps of:
 (a) continuously contacting a first surface of a near molten thermoplastic substrate sheet with a heat-sensitive three-dimensional grass-like thermoplastic layer to form a laminate, the temperature of said substrate being sufficiently above the melting temperature of said three-dimensional layer to effect fusion bonding of said three-dimensional layer to said substrate;
 (b) simultaneously inhibiting the loss of heat from the surface of said substrate opposite to said first surface to balance the heat flow from opposing surfaces of said substrate during said contacting; and
 (c) maintaining a balanced heat flow from opposed surfaces of said substrate as said laminate cools.

* * * * *